April 10, 1956     H. G. YOUNG     2,741,015

METHOD OF MAKING A CAGED NEEDLE ROLLER BEARING

Filed March 2, 1953

United States Patent Office 2,741,015
Patented Apr. 10, 1956

2,741,015

METHOD OF MAKING A CAGED NEEDLE ROLLER BEARING

Harold G. Young, East Orange, N. J.

Application March 2, 1953, Serial No. 339,607

6 Claims. (Cl. 29—148.4)

This invention relates to a method of making a caged needle roller bearing.

An object of the invention is to provide a novel and improved method of construction of a bearing in which a plurality of needle rollers are disposed in a cage and assembled to a channel shaped outer race.

Another object of the invention is to provide a novel and improved method of construction and assembly of a caged needle roller bearing, in which the cage is initially deformed to permit placing of the rollers, and then is restored to its normal un-deformed condition, confining the rollers in suitable position for providing a good bearing surface arrangement.

A further object of the invention is to provide a novel and improved construction of caged needle roller bearing, in which a one-piece cage is used with an outer race having integral flanges at the ends, the cage being distorted into substantially kidney-bean shape prior to insertion into the outer race, and then restored to final rounded shape and sized by means of a suitable mandrel or other means, without interference with the rollers themselves.

Still another object of the invention is to provide a novel and improved method of bearing construction, in which the slots of the cage are stamped smaller in width than the diameter of the rollers, so as to hold the rollers in place and alignment by a line contact which is smaller in diameter than the pitch diameter of the rollers, the cage being deformed into kidney bean shape, and then reformed inside the outer race into final rounded position, with the rollers engaging the slots in the cage.

Still a further object of the invention is to provide a novel and improved method of bearing construction, which is simple in the parts needed therefor, simple in the steps of the method, and the manufacture of which may be carried out at low cost and without the need for highly skilled labor.

These and other objects and advantages of the invention will become apparent from the following description of a preferred embodiment thereof, as illustrated in the accompanying drawings, forming a part hereof, and in which, Fig. 1 is a perspective view showing the cage of the bearing in its original cylindrical shape;

In the manufacture of caged needle roller bearings, many problems arise, it being especially important to assemble the various elements forming the bearing quickly and easily, and with lowest expenditure of time and labor. The present invention provides a method whereby a one piece channel shaped outer race with inwardly extending end flanges may be fitted with a plurality of needle rollers or the like, securely disposed in slots formed in a slotted cage, the inside diameter of which is about that of the end flanges, so that the whole assembly is retained in combined form with a high degree of compactness. To this end the cage is deformed from its normal cylindrical shape, to allow it to enter the outer race, the rollers being first disposed inside the outer race in their final normal positions, and then the cage is reformed to its cylindrical shape, to support the rollers properly for effective bearing action.

In order to understand clearly the nature of the invention and the best means for carrying it out, reference may now be had to the drawings, in which like numerals denote similar parts throughout the several views.

Figure 1:
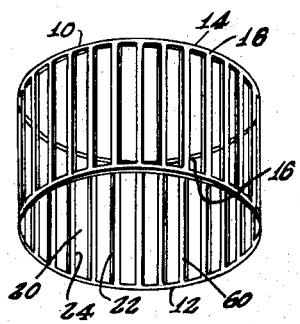

As shown in Figure 1, there is a cage member 10 normally in the form of a thin walled annulus or tubular member having end edges 12 and 14 and inner and outer wall surfaces 16 and 18. A number of slots 20 are formed longitudinally in the cage member 10, all being mutually parallel and all of the same length. The walls 22 and 24 of the slots 20 are mutually parallel and spaced less than the diameters of the rollers 26 which are to extend into the slots in the manner of Figures 4, 5 and 6 when in assembled relation. From Figures 4, 5 and 6 it is also seen that the outside diameter of the cage 10, when in cylindrical form, is slightly less than the pitch diameter of the rollers 26, the pitch diameter of the rollers being an imaginary circle or cylinder intersecting the axes of all the rollers when in assembled relation.

The bearing also includes an outer race member 28, formed with a cylindrical body portion 30 interconnecting the two annular end flanges 32 and 34, which are integral therewith and mutually parallel to each other. A shaft 36 is to be engaged by the bearing as shown. An annular raceway 38 is thus formed in the outer race member 28, to receive the needle rollers 26, which may be elongated cylindrical members as shown. When in assembled positions, the rollers 26 roll on the floor surface of the raceway, and also roll on the shaft 36, in the manner shown.

Figure 2:
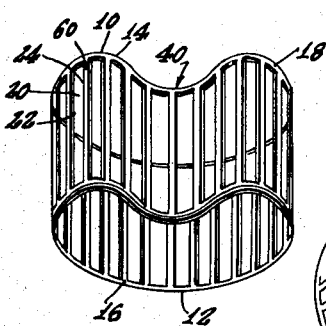
Fig. 2 is a perspective view showing the cage of Figure 1, but in the temporarily deformed shape ready for insertion into the outer race.
Figure 3:
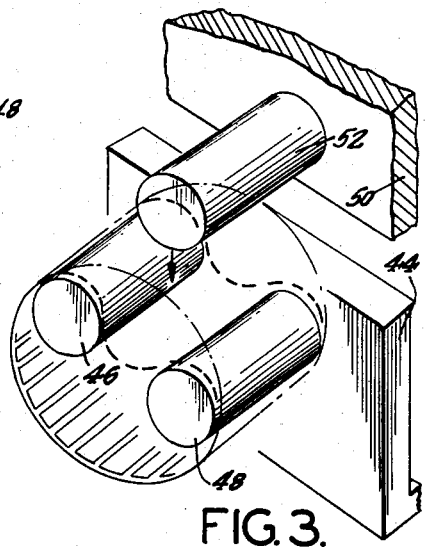
Fig. 3 is a perspective fragmentary view showing a a type fixture which may be employed for deforming the cage to the shape shown in Figure 2.
Figure 4:
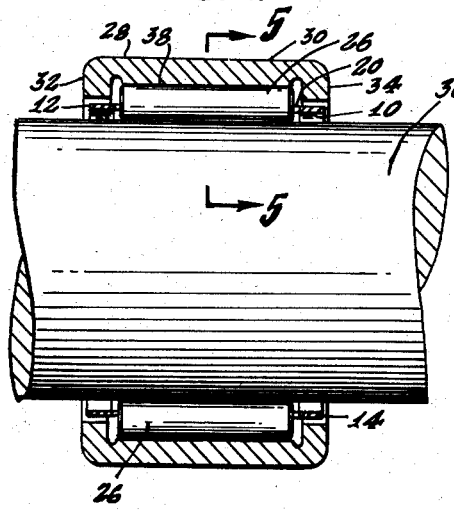
Fig. 4 is a cross-sectional view showing the completed bearing mounted on a shaft.
Figure 5:
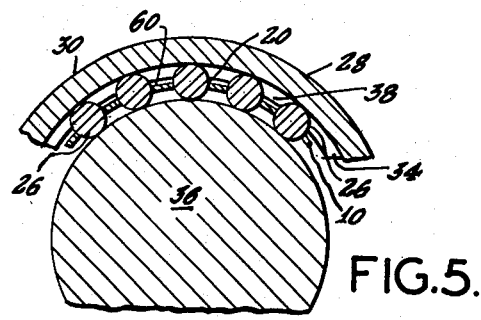
Fig. 5 is a cross-sectional view taken substantially on plane 5—5 of Figure 4.

From Figures 4 and 5, it is seen that the cage 10 must be received in the passageway or bore of the outer race 28, with the rollers 26 received in the cage slots 20. To accomplish this, I provide means for deforming the normally cylindrical cage 10 of Figure 1, to reshape it into a tubular member of kidney bean shape, as seen in Figure 2, with a depression formed therein as seen at 40. The cage 10 may be first stamped out to form its slots, as shown in Figure 1. The integral end ring diameters are round to allow the cage to float on their ground bore. The stamped cage 10 is then placed in a fixture as shown in Figure 3, including a stationary wall 44 carrying projecting shafts 46 and 48, with another wall 50 carrying a projecting shaft 52, all the shafts being mutually parallel and all perpendicular to the plane of the walls 44 and 50. It is clear that when the wall 50 is lowered, its shaft 52 presses into the cylindrical wall of the cage 10, midway between the shafts 46 and 48, and forms the depression 40 in the cage, at the same time lowering its diametral dimensions to be less than the inside diameter of the annular flanges 32 and 34 of the outer race member.

The rollers 26 are placed in the channel 38 of the outer race, in approximately the same positions they will assume after the cage is inserted and formed, and may be held in position in this race by means of heavy grease or by a suitable fixture, not shown. The deformed cage shown in Figure 2 can then be easily inserted between the rolls 26, inside the outer race, and after locating laterally may be reshaped to a cylindrical form.

Figure 6:
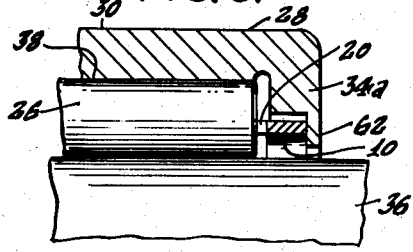
Fig. 6 is a fragmentary cross-sectional view similar to that of Figure 4, but showing a modified form of the invention.

Figure 4 shows the end flanges 32 and 34 of such an inside diameter as to leave open the end edges of the cage ends 12 and 14. In Figure 6, the end flanges 32 and 34 may have extensions such as 62, which are arranged so as to enclose the outer end edges of the cage 10, centering and confining the same.

Although I have described my invention in specific terms, it will be understood that various changes may be made in size, shape, materials and arrangement without departing from the spirit and scope of the invention as claimed.

I claim:

1. A method of making a caged needle roller bearing comprising the steps of forming an outer race member with a cylindrical web interconnecting annular radial end flanges, so as to define an outer raceway, disposing a plurality of rollers in said raceway, forming a cage member in substantially continuous cylindrical shape with a plurality of longitudinally oriented slots to receive said rollers, deforming said cage member out of said cylindrical shape, inserting said deformed cage member in said outer race member, and reforming said cage member to cylindrical shape, so that portions of all said rollers are received in its slots.

2. The method according to claim 1, wherein said cage member is deformed so that its diametral dimensions are less than its original outside diameter when undeformed.

3. The method according to claim 1, wherein said cage member is deformed substantially to kidney bean shape, when viewed from either end thereof.

4. A method of making a caged needle roller bearing comprising the steps of forming an outer race member with a cylindrical web interconnecting annular radial end flanges thereof, so as to define therein an inwardly open annular raceway, disposing a plurality of rollers in mutually spaced positions in said raceway, holding said rollers in said positions, forming a continuous cylindrical cage member with a plurality of longitudinally oriented mutually parallel slots for receiving said rollers, said cage member being so formed that its outside diameter is less than the pitch diameter of said rollers as thus disposed, deforming said cage member out of said cylindrical shape so that its diametral dimensions are less than the original outside diameter thereof before being deformed, inserting said deformed cage member in said outer race member so that its end portions approximate in location the end flanges of said outer race member, and then reforming said cage to its original cylindrical shape and size, so that said rollers enter said slots, said reforming of the cage being accomplished by pressure exerted on the unslotted areas of said cage.

5. The method according to claim 4, wherein said deformation of said cage is brought about without stretching of the material forming said cage.

6. The method according to claim 4, wherein said deformation step is brought about by placing a pair of shafts inside said cage, and moving a third shaft against the outside surface of said cage, on a line midway between said pair of shafts, so that said cage is deformed to kindey bean shape.

References Cited in the file of this patent

UNITED STATES PATENTS

| | | |
|---|---|---|
| 666,241 | Barraclough | Jan. 15, 1901 |
| 1,114,384 | Prime | Oct. 20, 1914 |
| 1,762,891 | Rouanet | June 10, 1930 |
| 1,894,595 | Mitchell | Jan. 17, 1933 |
| 2,037,067 | Crossman | Apr. 14, 1936 |
| 2,146,440 | Pew | Feb. 7, 1939 |
| 2,288,340 | Yates | June 30, 1942 |
| 2,539,237 | Dreyer | Jan. 23, 1951 |